US006860998B1

(12) United States Patent
Wilde

(10) Patent No.: US 6,860,998 B1
(45) Date of Patent: Mar. 1, 2005

(54) PROCESS AND APPARATUS FOR PREPARING EXTRACTS AND OILS FROM PLANTS AND OTHER MATTER

(75) Inventor: Peter Frederick Wilde, Thirsk (GB)

(73) Assignee: Naturol Limited, St. Hellier (GB)

( * ) Notice: Subject to any disclaimer, the term of this patent is extended or adjusted under 35 U.S.C. 154(b) by 144 days.

(21) Appl. No.: 10/049,145

(22) PCT Filed: Aug. 4, 2000

(86) PCT No.: PCT/GB00/02957

§ 371 (c)(1),
(2), (4) Date: Jun. 17, 2002

(87) PCT Pub. No.: WO01/10527

PCT Pub. Date: Feb. 15, 2001

(30) Foreign Application Priority Data

Aug. 5, 1999 (GB) ............................................ 9918436

(51) Int. Cl.[7] ................................................ B01D 11/00

(52) U.S. Cl. ....................... 210/634; 210/136; 210/194; 210/511; 210/774; 210/805; 554/12; 554/14

(58) Field of Search .......................... 208/308; 210/136, 210/175, 177, 182, 194, 195.1, 257.1, 259, 511, 634, 638, 639, 774, 805, 806; 426/429, 430; 554/12–14; 570/174

(56) References Cited

U.S. PATENT DOCUMENTS

| | | | | | |
|---|---|---|---|---|---|
| 2,109,157 | A | * | 2/1938 | Tijmstra | 208/208 R |
| 4,331,695 | A | | 5/1982 | Zosel | 426/430 |
| 4,675,133 | A | * | 6/1987 | Eggers et al. | 554/8 |
| 5,892,136 | A | * | 4/1999 | Nagasaki et al. | 570/174 |
| 6,248,910 | B1 | * | 6/2001 | Franke | 554/12 |

FOREIGN PATENT DOCUMENTS

| | | |
|---|---|---|
| EP | 0 616 821 B1 | 10/2001 |
| GB | 2.072.189 | 9/1981 |
| WO | WO 95/26794 | 10/1995 |
| WO | WO 00/43471 | 7/2000 |

* cited by examiner

*Primary Examiner*—Joseph Drodge
(74) *Attorney, Agent, or Firm*—Seed IP Law Group PLLC

(57) ABSTRACT

The invention relates to a process for extracting fixed and mineral oils, and/or essential oils, from materials using a process of solvent extraction which is performed under pressure. The solvent is iodotrifluoromethane or iodotrifluoromethane in combination with a co-solvent. The invention also relates to an apparatus for performing the extraction of fixed and mineral oils, and/or essential oils. Substantial reductions in or elimination of the normally high latent heat of solvent evaporation may also be achieved simply by raising or lowering the temperature of or simply by adding or removing "sensible" heat from the solvent at appropriate points during its re-circulation.

25 Claims, 1 Drawing Sheet

Figure 1:
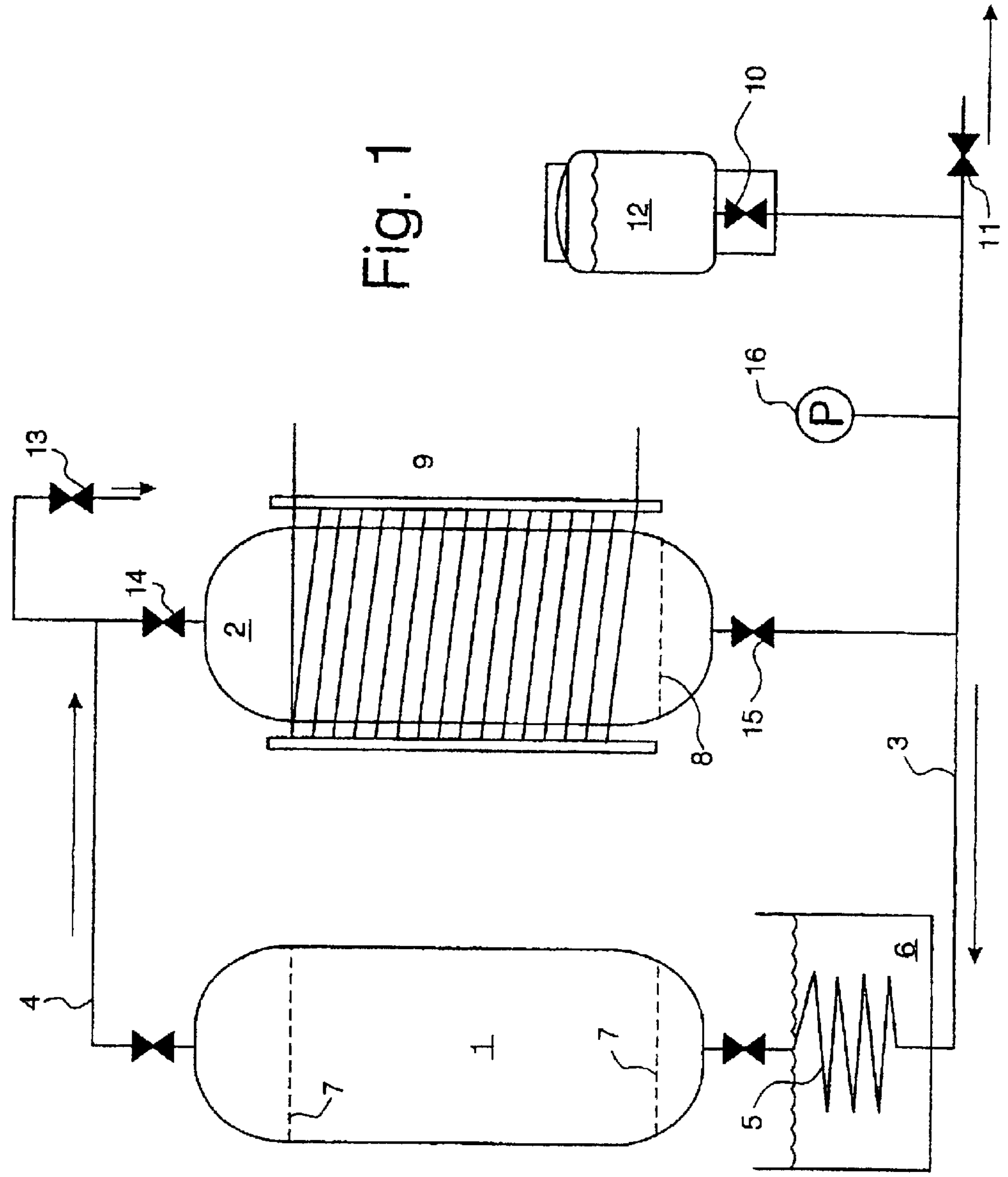

PROCESS AND APPARATUS FOR PREPARING EXTRACTS AND OILS FROM PLANTS AND OTHER MATTER

The present invention relates to a method of extracting and concentrating oils from materials in which the oils are already dispersed. More particularly, the present invention is concerned with the extraction of fixed and mineral oils and/or volatile oils such as essential oils from materials using a process of solvent extraction which is performed under pressure.

The term "Fixed Oil" is usually used to describe oils of vegetable or animal origin which are not volatile oils. They routinely comprise natural mixtures of mono-, di and tri-glycerides, fatty acids, sterols (and their esters) and natural waxes.

"Mineral Oil" is a term usually used to describe petro-chemical oils often derived from below ground level, which are normally mixtures of aliphatic and aromatic hydrocarbons of a very wide variety of chain length and molecular weight. These oils are often the sources of lubricating and fuel oils.

The term "Essential Oil" is usually used to describe those volatile oils of low molecular weight which incorporate the fragrance and flavour of components derived from plant materials.

In an earlier application (GB 2276392) we described the use of HFC 134A (1, 1, 1, 2-tetrafluoroethane) as a solvent for the extraction of essential oils from natural sources.

However HFC 134a is in fact a very poor solvent for many compounds, particularly less volatile compounds. Thus, whilst HFC 134a is able to dissolve some essential oils thereby facilitating extraction of such oils from plant-based materials, this solvent is not able easily to dissolve compounds of lower volatility such as fixed oils. HFC 134a is therefore capable at ambient temperatures of extracting only very high quality fragrant and aromatic essential oils i.e. delicate oils of high volatility and low molecular weight and it will not dissolve the fixed oils which are also frequently associated with these components in the natural raw material.

Because HFC 134a is a very poor solvent, large quantities of it must be used in order to obtain a commercially acceptable yield of the desirable component extracted from most raw materials.

In another unpublished application (GB 9905054.4) we describe a process in which HFC 134a is used to extract fixed and mineral oils from a substance. This process relies on the unexpected finding that raising the temperature only a few degrees Celsius results in a marked increase in the solubility of fixed and mineral oils in HFC 134a. The process is conducted in a sealed apparatus including a first vessel in which the substance is contacted with HFC 134a at an elevated temperature and a second vessel in which the HFC 134a (now containing dissolved fixed or mineral oil) is cooled. The fixed or mineral oil is precipitated out of the solution and can easily be separated from the HFC 134a solvent which is then recycled to minimise losses and environmental impact.

In a variation of the process described in our unpublished application GB 9905054.4, the solvent may be a mixture of HFC 134a and a co-solvent in which the fixed or mineral oil to be extracted is relatively soluble. The dissolving properties of HFC 134a are significantly increased by the addition of a suitable co-solvent. Suitable cosolvents which can be added to HFC 134a may be liquids at room temperature or liquefied gases and include hydrocarbons such as the alkanes, benzene and its esters, low boiling aliphatic esters such as acetates and butyrates, ketones such as acetone, methyl isobutyl ketone, methyl ethyl ketone, chlorinated, fluorinated and chlorofluorinated hydrocarbons such as dichloromethane and dichloro difluoromethane, ethers and such as dimethyl ether and diethyl ether, dimethyl formamide, tetrahydrofuran, dimethyl sulphoxide, alcohols such as methyl alcohol, ethyl alcohol, n-propanol, iso-propanol, acids such as acetic acid, formic acid and even acetic anhydride, nitriles such as acetronitrile (methyl cyanide), anhydrous liquefied ammonia and other liquefied gases such as sulphur dioxide, nitric oxide, nitrogen dioxide, nitrous oxide, liquefied hydrogen sulphide, carbon disulphide, nitromethane, and nitrobenzene could all be used in this process.

The most useful co-solvents have proved to be butane and dimethyl ether. Regrettably, though, many of the useful co-solvents which are mixed with HFC 134a re-confer the serious hazard of flammability on the mixtures and therefore raise safety issues. There may, depending on the choice of co-solvent, be other problems such as environmental issues.

Although it is neither a serious ozone depleter nor a VOC, unfortunately HFC 134a is a potent and powerful greenhouse gas. It has a global warming potential or greenhouse effect some 8 times as strong as carbon dioxide. HFC 134a is very chemically inert and persists in the environment for very long periods of time, during its decomposition. It has a t½ life between 8.6 and 16.7 years.

Historically solvents such as hexane, petroleum fractions, benzene, methylene chloride (dichloromethane) have been widely used to extract oils from an enormous range of flavoursome oleo-resins, drug containing extracts and fragrant raw materials ("concretes"). These solvents are in common use even in the engineering, petroleum and mineral industries, where they are often used to de-grease raw materials containing or coated in oil and to clean metal parts, by the removal of oily lubricating preparations. Useful amounts of oils have even been extracted from mineral raw materials such as oil shales and tar sands with such solvents. Even soils contaminated with oily industrial waste may be remediated with such solvents.

As they are all highly flammable, one disadvantage of conventional solvent systems such as hydrocarbon solvents, for example hexane and benzene and petroleum fractions, has always been the dangers of fire or explosion and incineration. These solvents also present further hazards to the operators of such processes because many hydrocarbon and chlorinated solvents are harmful or toxic by inhalation and ingestion. They are frequently carcinogenic and all of the hydrocarbon solvents used in current practice are classed as VOCs (volatile organic compounds) which are said to have a positive photo-chemical ozone generating potential.

A further disadvantage of the most commonly used solvents, hexane and "petroleum ether", is that their boiling points (at atmospheric pressure) are in excess of 50 degrees Celsius. Hence, in order to remove such solvents from the solutions of the desired components, the desired component must either be exposed to high temperatures or high vacuum. Both of these treatments detract from and are damaging and deleterious to the quality of the desired component or extract. Also, the evaporation of the solvent from the solution of the oil, and the solvent recovery by condensation is expensive on account of the energy costs.

The finished products from such processes are often intended for public consumption and the presence of toxic or harmful residues may present difficulties when seeking regulatory approval of the finished product.

These problems become even more serious when (as is increasingly the case) statutory authorities are demanding that the solvent residue levels in oils sold for use in human food stuffs are required to meet increasingly stringent requirements such as solvent residue levels of only 50, 10 and even 1 part per million. Achieving such levels of solvent residue requires that the solution and extract be exposed to very high vacuum and/or very high temperatures. Such treatment can result in serious loss of the precious volatile components from the extracts and serious thermal damage to the desirable component.

A strategy to overcome these problems has long been to employ hydrocarbon solvents such as butane and even propane (in liquid form under pressure). However, these processes are even more dangerous, of course, as any leakage of the (usually odourless) solvent vapours from the operating equipment, poses a greatly enhanced risk and chance of explosion and incineration.

The use of less flammable solvents such as chlorinated hydrocarbon solvents has gone some way to reducing these risks. For example, the use of methylene chloride (dichloromethane) to extract valuable components such as caffeine from coffee and tea has become common. Similarly, perchloroethylene has a long history of use in the dry cleaning industry to de-grease oily clothing.

However, many of the traditional chlorinated solvents present their own problems. Most of these materials are either harmful or toxic or may be damaging to the environment. Their vapours are believed to deplete the protective ozone in the stratosphere. Many of these chlorinated solvents are also greenhouse gases and may lead to global warming.

The process and apparatus we now describe in this specification are of great value in the extraction of high quality, desirable components such as oils, pigments, pharmacologically active ingredients and resins from a wide range of substrates comprising plant, animal and mineral matter, of both terrestrial and marine origin. The same process and apparatus, when using the solvent systems according to an embodiment of the invention, are able to extract fixed and mineral oils.

The process comprises the contacting of the substrate (such as a bulk raw material) in which the desired component is already contained, with a solvent so as to allow the desired component to dissolve in the solvent. It provides for the removal and separation of the substrate from the solution of the desired component in the solvent. It further provides for the removal of the solvent from the solution and its recovery for recycling and re-use, and for the harvesting of the solute from which the solvent has been removed. The solute—in such cases—comprises the desired component.

The extraction of desirable components from a substrate in many of the prior art processes must be carried out in sealed (pressure vessel) equipment. In any solvent extraction process it is normally highly desirable for economic and environmental reasons to collect as much of the used solvent from the solution formed (of the solvent and the desirable component) and from the spent and extracted bulk raw material. Nevertheless it is inevitable that some loss of solvent vapour into the atmosphere always occurs.

This consideration has lead us to search for a solvent which has more acceptable physiological and environmental characteristics and which is also an effective solvent capable of extracting fixed, mineral and essential oils.

The present invention thus aims to provide an economical process which is also able to provide the extracted oils in relatively high yield. It is also an aim to provide a quick extraction process which can be used commercially.

It is also an aim to provide a process which is easy to run and which does not require bulky or complicated apparatus. It is another aim to use a solvent which is not environmentally damaging and which does not have any significant photochemical ozone generating potential. Such a process aims to eliminate or reduce the losses of solvent during the extraction process. Indeed, it is a further aim to provide a process in which solvent losses are minimised so that there is substantially 100% solvent recovery.

It is also an aim to avoid the risk of fire or explosion by using a non-flammable solvent system, or at least a system having a significantly reduced risk of fire or explosion.

It is also an aim to minimise the content of any toxic solvent residues in the final product and preferably to achieve a product in which there are substantially no toxic solvent residues. It is an aim that the extracted oil be substantially free of traces of solvent so that the extracted oil may easily satisfy any present or future regulatory requirements.

It is also intended to dispense with the need for the elimination of, or evaporation and condensation of, large quantities of solvents in order to obtain the final product from the solvent.

We have found that iodotrifluoromethane (ITFM) satisfies most or all of these requirements.

According to a first aspect of the invention there is provided a method of extracting oil from an oil-bearing substrate comprising:

(a) contacting the substrate with a solvent comprising iodotrifluoromethane and, optionally, one or more cosolvents to form a solution of the oil in the solvent;
(b) separating the solution from the substrate; and
(c) removing the solvent from the solution to provide the desired oil.

In a first embodiment of this aspect of the invention the method comprises contacting the solvent with the substrate in a first vessel and separating the resulting solution from the substrate by transferring the solution to a second vessel while retaining the extracted substrate in the first vessel.

Preferably the first and second vessels are each sealable and each include an openable and closable valve, the method further comprising the steps of:

(i) connecting the vessels together to provide a flow path between the vessels via said valves; and
(ii) opening the valves of the vessels and causing the solution to flow from the first vessel to the second vessel.

In a particularly preferred embodiment, the method further comprises the step of applying heat to heat the solvent in the first vessel. This step facilitates the dissolution of the oil in the solvent.

In another particularly preferred embodiment, the method further comprises the step of cooling the solution in the second vessel. This cooling step can cause the oil to precipitate from the solvent, so that the oil and solvent can be separated.

According to a second aspect of the invention there is provided a method of extracting oil from an oil-bearing substrate comprising:

(i) providing an apparatus comprising first and second sealable vessels, the first vessel including means for retaining said substrate in the vessel, each vessel having an inlet and an outlet and being so connected as to provide a fluid flow circuit only in the direction from the outlet of the first vessel to the inlet of the second vessel and from the outlet of the second vessel to the inlet of the first vessel;
(ii) charging the oil-bearing substrate into the first vessel;

(iii) charging the apparatus with a solvent comprising iodotrifluoromethane and, optionally, one or more co-solvents so that the solvent contacts the substrate and forms a solution of the oil in the solvent;

(iv) causing said solution to flow in said fluid flow circuit from the first vessel to the second vessel; and (vi) separating the solvent from the oil in the second vessel and recovering the oil.

This aspect of the invention provides a continuous process for extracting oil from a substrate.

In a particularly preferred embodiment of this aspect of the invention, the method further comprises the step of applying heat to the solvent in the first vessel, or adjacent the inlet of the first vessel. This heating step facilitates dissolution of the oil in the solvent In another particularly preferred embodiment, the method further comprises the step of cooling the contents of the second vessel. This cooling step can cause the oil to precipitate from the solvent for subsequent separation and recovery.

Preferably the method of this aspect of the invention further comprises recovering the separated solvent for use in further extractions.

In particularly preferred embodiments of the first and second aspects of the invention, the optional co-solvent is selected from HFC 134a and HFC 4310.

Iodotrifluoromethane has the advantage that it has no global warming potential and is not a VOC. It is not flammable, indeed actually used as fire extinguisher. It does not deplete the ozone layer, is effectively non-toxic and represents virtually no biological hazard or environmental threat. It has a very low boiling point (−22.5 degrees Celsius at atmospheric pressure) and a modest vapour pressure of only 63.7 psi (4.3 Bar) at 25 degrees Celsius.

ITFM is an excellent extraction medium and solvent for many of the oils of commerce including triglycerides, fatty acids, sterols and their esters, natural waxes, hydrocarbons (both straight and branched chains and cyclic and polycyclic) with molecular weights up to several hundreds. It also dissolves fragrance oils, pigments, flavour oils and many pharmaceutical components from natural plant and animal raw materials. For these uses in the process of the invention, it is not usually necessary to perform a heating step.

ITFM also presents no special problems in handling and recovery for recycling.

Although ITFM is currently a costly solvent, the financial penalty attendant on its use may be minimised using the process of the present invention since almost complete solvent recovery occurs. Furthermore, the solvent offers tremendous advantages to the environment.

Because it has a low boiling point, extraction of and recovery of desirable components can be carried out at room temperature or below, thus eliminating any chance of thermal degradation or damage to the extracts that often occurs when other solvents are used. Iodotrifluoromethane (ITFM) is pH neutral and does not hydrolyse appreciably in water at room temperature.

Should it be necessary to reduce the wide spectrum of solutes which dissolve in iodotrifluoromethane (ITFM) (i.e. to render it more selective), it can be mixed with one or more poor or non-solvents. Suitable poor solvents or non-solvents are for example, HFC 134a (1,1,1,2-tetrafluoroethane) or HFC 4310 (1,1,1,2,2,3,4,5,5,5-decafluoropentane). This may be done to impart selectivity to the extraction process in order to enhance the amount of a particular oil in a mixture of extracted oils. In this case, since the co-solvent (such as HFC 134a) only represents a part of the solvent mixture (rather than being the sole solvent) any problems which may be associated with the co-solvent itself are minimised.

A feature of the invention thus makes use of the property of mixtures of ITFM and one or more suitable co-solvents to dissolve to specified and finite limits of molecular weight or polarity. This confers a degree of selectivity on the solvent mixtures to extract components of specified molecular weight, such as volatile components of fragrance oils, whilst excluding from solution many of the materials which would then be considered to be undesirable contaminants, such as triglycerides, fatty acids and natural waxes. It is, however, important that the presence of the co-solvent still provides a solvent system which meets statutory or other requirements relating to toxicity or other health hazards.

A related feature of this invention also makes use of the observation that certain mixtures of ITFM with one or more suitable co-solvents do not dissolve fixed oils such as triglycerides, fatty acids, natural waxes, mineral oils and petroleum fractions etc at low temperatures. At elevated temperatures, such solvent mixtures do in fact dissolve these materials. Hence it becomes a simple matter to dissolve such fixed and mineral oils and extract them from the substrate such as bulk raw material in which they occur by heating the solvent mixture in the presence of the substrate. Removal of the heated solution and cooling it causes the solutes to precipitate from solution in all cases. The solutes (being of lower specific gravity than the solvent) float to the top of the cooled solution and can be easily harvested. In this case, the method would involve the step of elevating the temperature and the step of cooling the separated solvent solution once it has been transferred to the second vessel so as to release any dissolved oil. At this point, either the released oil or the iodotrifluoromethane solvent can be removed from the second vessel to complete the separation.

The invention also relates to an apparatus for performing oil extraction.

According to a third aspect of the invention there is provided an apparatus for the extraction of oil from an oil-bearing substrate comprising first and second vessels, connecting means providing fluid communication between the vessels, at least one closable valve operable to prevent fluid communication between the vessels, the first vessel being adapted to receive the oil-bearing substrate and including means for retaining the substrate in the first vessel, and, a solvent provided in the first vessel comprising iodotrifluoromethane and, optionally at least one co-solvent, which solvent may be transferred between the first and second vessels via the or each closable valve.

In an especially preferred embodiment of this aspect of the invention, each vessel comprises an inlet and an outlet, the outlet of the first vessel is connected by first connecting means to the inlet of the second vessel, the outlet of the second vessel is connected by second connecting means to the inlet of the first vessel, the first and second connecting means include at least one said closable valve, and each closable valve is a one-way valve permitting fluid flow in one direction only, the valves being arranged to provide a fluid flow circuit such that the solvent may flow around the circuit in one direction only. This embodiment allows a continuous extraction process to be carried out.

Preferably one closable one-way valve is provided at each respective inlet and each respective outlet of the first and second vessels. In this way, the first and second vessels can be isolated as required.

Preferably the apparatus includes heating means for heating the solvent in the first vessel or adjacent to the inlet of the first vessel and/or cooling means for cooling the contents of the second vessel.

In a desirable for the apparatus further comprises a reservoir of solvent operatively connectable to the fluid flow circuit. Preferably, the apparatus also includes means for withdrawing solvent from the fluid flow circuit. Desirably, the point for addition of solvent from the reservoir and/or the point for withdrawal of solvent is/are between the outlet of the second vessel and the inlet of the first vessel.

Preferably the apparatus further comprises means for withdrawing, from the second vessel or from the connecting means adjacent the second vessel, oil which has separated from the solvent.

In a further embodiment, the apparatus includes means for determining the pressure in the circuit and/or the temperatures of the first and second vessels.

In a further embodiment, the first and second vessels are transparent pressure vessels capable of withstanding pressures of not more than 25 bar.

A fourth aspect of the present invention provides a method of extracting oil from an oil-bearing substrate comprising the steps of:

(i) contacting the substrate with a solvent comprising iodotrifluoromethane and, optionally, one or more co-solvents thereby to dissolve the oil in the solvent; and (ii) causing the oil to separate from the solvent to form immiscible liquid layers of oil and solvent.

Preferably step (ii) involves cooling the solution of oil in the solvent.

Also preferably step (i) includes heating the solvent.

A fifth aspect of the invention provides a method of extracting oil from an oil-bearing substrate comprising the steps of:

(i) contacting the substrate with a solvent comprising iodotrifluoromethane and, optionally, one or more co-solvents, thereby to dissolve the oil in the solvent; and (ii) allowing the solvent to evaporate at ambient or subambient temperatures.

In a preferred embodiment of this fifth aspect of the invention the method further comprises recovering the evaporated solvent and compressing the solvent to reliquify it.

The present invention also contemplates the use of iodotrifluoromethane for the extraction of oil from an oil bearing substrate, and also the use of a solvent comprising iodotrifluoromethane and at least one co-solvent for the extraction of oil from an oil-bearing substrate.

The present invention further includes an oil obtainable by, or when obtained by, the method of any of the first, second or fourth aspects of the invention.

The present invention also includes a vegetable oil for use in foodstuffs obtainable by or when obtained by, the method of any of the first, second or fourth aspects of the invention and containing substantially no residue of solvent, especially iodotrifluoromethane.

The appropriate co-solvent, and the iodotrifluoromethane:co-solvent ratio for a given substance are determined as follows.

An empty bottle together with a removable seal is weighed and the weight recorded (Weight A). This assembly should be designed to be able to withstand a pressure of say 10 BarG.

Into the bottle is placed a sample of the substance i.e. the oil-containing substrate (raw material) to be extracted, or a sample of the oil itself.

The bottle and seal is weighed again and the weight recorded (Weight B). The bottle is then closed and sealed. The difference between weight B and weight A is the weight of the substrate containing oil or the oil.

The iodotrifluoromethane alone is introduced into the bottle and the mixture shaken until the contents are homogenous and the solute is in complete solution. The bottle and contents are weighed again and the final weight of the bottle and contents are recorded (Weight C). The difference between Weight B and Weight C is the weight of the added iodotrifluoromethane.

Co-solvent in which the solute is only poorly soluble or in which it is insoluble is then progressively introduced into the bottle. At first no obvious change takes place, but as the quantity of co-solvent is increased, the contents of the bottle will be seen to turn from crystal clear to opalescent. The weight of the bottle and contents is again recorded (Weight D). The difference between Weight D and Weight C is the quantity of co-solvent added.

In order to ensure that the precipitation of oil from the mixture has reached its optimum, the bottle may now be placed in a refrigerator, whereupon the contents will first become cloudy and soon a clear and distinct layer of oil will separate and float on the lower layer of clear solvent. The solvent at low temperature can then be withdrawn and introduced to another bottle charged with more of the oil or the oil-containing substrate (raw material). This cold solvent will not dissolve the oil, but on warming, it will be seen to form a homogeneous solution (which will itself separate again into two layers on cooling).

This procedure will allow calculation of the composition of a solvent mixture. For example: The total weight of solvent used is D−B. The weight of iodotrifluoromethane is C−B and the weight of co-solvent is D−C.

Hence the weight % composition of the solvent is:

$$\text{iodotrifluoromethane} = (C-B/D-B)\times 100\%$$

$$\text{co-solvent} = (D-C/D-B)\times 100\%$$

The % concentration of solute in the solution $$=(B-A/D-A)\times 100\%$$

The invention will now be described with reference to FIG. 1 which shows an apparatus suitable for continuous extraction of fixed and mineral oils according to one embodiment of the process of the present invention.

Two vessels (1) and (2) equipped with closable valves were coupled together via two sets of tubing (3, 4). Both vessels are capable of withstanding pressure typically up to 25 bar. Below vessel (1), the tubing (3) was in the form of a coil (5) sitting in a bath of liquid (6) which could bc heated and maintained at a pre-selected temperature. The coil of tubing (5) could, however, be heated by another means or vessel (1) could be heated directly.

Vessel (1) was equipped with internal filters (7) at both ends, whereas vessel (2) was equipped with a filter (8) only at the lower end.

The second vessel (2) was surrounded by coils (9) containing a flow of cooling liquid and the outside of the coils was insulated. Other means of cooling vessel (2) could also be used, for example a stream of cooling gas or a cooling bath.

The circuit was furnished with an inlet (10) and outlet (11) valves for solvent. During operation of the equipment, the inlet valve was coupled to a solvent reservoir (12) which could be used to both fill the system with solvent and maintain the level of solvent during operation. Outlet valve (11) was provided to enable the system to be drained.

At the top of vessel (2), a valve (13) is fitted to facilitate the recovery of oil when this becomes necessary or desirable. A pressure gauge (16) may be provided in the circuit.

The same equipment can be used regardless of whether the solvent is iodotrifluoromethane alone or in combination with a co-solvent, and regardless of whether any heating or cooling is actually performed.

The operation of the equipment is for the purpose of illustration only described as follows in relation to a mixture of iodotrifluoromethane and a co-solvent to extract a fixed oil.

1. Vessel (1) (which has removable end caps) is charged with the substrate from which oil is to be extracted (usually in the form of a finely divided particulate solid). The end caps and filters are then replaced. The vessel is then connected to the remainder of the equipment. Air is then removed from the sealed equipment at this stage.
2. The equipment (now fully sealed) is then fully charged with solvent from the bulk solvent storage tank (12) (which remains connected to the equipment throughout the operation).
3. The heating bath (6) is then filled with water or oil and the heating means turned on if required.
4. If required, cold liquid or gas is circulated round the cooling coils (5) causing the temperature of the second vessel (2) (and its contents) to cool.

As the temperature of the liquid in the heating bath rises, so does the temperature of solvent in the tube below vessel (1). This, of course, causes hot solvent in vessel (1) to rise through the oil containing substrate of the vessel (I) due to natural convection.

The substrate is restrained inside vessel (1) by the filters (7) disposed at the top and bottom. The liquid displaced upwards is replaced by cold liquid falling through vessel (2) due to convection.

The entire liquid in the circuit thus becomes mobile and circulating. As hot liquid passes up through the substrate of vessel (1) oil is exacted from the substrate. As the solution enters the top of vessel (2) it is cooled and its solute (the oil) precipitates out of solution.

Alternatively, in the absence of heating and the resulting convection currents which occur, the solvent may be pumped around the circuit.

Because the oil is lighter than the solvent, it floats to the top of vessel (2) and collects there as it is not able to pass out of the bottom of vessel (2).

When it is considered that sufficient oil has been extracted, all the valves are closed except valve (14) (the inlet valve for vessel (2)) and valve (15) (the outlet valve for vessel (2)). Valve (13) is then opened to release the oil and the oil can be decanted into a bottle.

The system may be emptied after use by allowing solvent to drain out of valve (1) into a suitable container for recycling and recovery by evaporation.

It will be immediately apparent to one versed in the art, that this process is capable of producing oil without any evaporative step. Since evaporation of the solvent is one of the major costs involved in more traditional methods of extraction, this constitutes a major improvement in the extraction of such oils and represents a significant cost saving.

Since iodotrifluoromethane is neither flammable, nor toxic, nor environmentally damaging and (in normal operation) is never released into the environment, the process of the present invention represents a significant improvement over current technologies.

In another embodiment of the process (not shown), the apparatus comprises two sealable vessels (which are preferably transparent and made of strengthened or reinforced glass) each being capable of withstanding a pressure of up to 20 bar or even 25 bar. Each vessel is equipped with a closable valve which acts as an inlet and an outlet valve. One vessel is also equipped with a removable filtering device, such as a wire gauze or wire wool to prevent the exit of raw material from the vessel at the same time as the solvent is withdrawn.

The two vessels are connected to each other via their inlet/outlet valves so as to form a sealed unit. Typically each vessel is 50 ms to 2000 mls capacity, and preferably 100 mls to 500 mls. Such an apparatus is easily assembled and handled. However, there are no particular limitations other than the usual practical limitations, on the upper size of such apparatus.

In this embodiment (not shown), it is possible to extract a fixed or mineral oil from a substance in an apparatus comprising two vessels which is not arranged in the form of a circuit. The substrate (raw material) is placed in a first vessel and the extraction medium (i.e. the solvent) is also introduced into the first vessel. The inlet/outlet valve of both vessels are then closed and the ensemble is warmed, typically to 40°–60° (and preferably not more than 50° C.), in an oven or using other suitable heating means. The apparatus may be agitated during heating or may contain agitation means such as a magnetic flea.

After an appropriate residence time at the elevated (holding) temperature, typically in the range 1 to 20 minutes and preferably in the range 3 to 8 minutes from the point of view of efficiency and cost effectiveness, the solution is transferred from the first vessel to the second vessel and the ensemble is cooled to room temperature or lower. Ideally, the ensemble is cooled to a temperature in the range −10° to 25° C. and preferably in the range 0° to 20° C. Cooling below −10° C. is possible but increases the costs and complexity of the process.

Transfer of the solution is achieved via the inlet/outlet valves and the raw material remains in the first vessel on account of the filter. The valves are closed following transfer of the solvent and before cooling is commenced.

On cooling, the extracted oil precipitates out of solution and begins to aggregate. Since the extracted oil is invariably significantly less dense that the solvent medium the extracted oil floats on the top of the solvent layer as a separate immiscible/insoluble layer. The extracted oil can thus be easily separated by decanting. The solvent, which is almost entirely free of the oil, can then be returned to the first vessel for use in a further extraction cycle. This process can be repeated several times if desired. From a practical point of view, 10 cycles is the upper limit with 3 to 5 cycles being preferred on the basis of efficiency and time.

This manual procedure though highly effective, was somewhat tedious to carry out and the whole process is preferably performed as a continuous operation as described above.

Temperature Difference Between Vessels (1) and (2)

For maximum economic use of equipment designed to prepare extracts such as those of interest such as fixed or mineral oils, it is beneficial to operate vessels (1) and (2) at widely dissimilar temperatures. (The difference between these temperatures is commonly referred to as "ΔT"). The larger the "ΔT" the better the equipment will perform.

However, limits on "ΔT" are imposed by the design and fabrication of the equipment.

Upper limit of Operating Temperature of Vessel (1)

When iodotrifluoromethane is used, whether mixed with another solvent or not, a rise in the temperature of operation of Vessel (1) will automatically cause an increase in the pressure (vapour pressure) within the sealed system. Indeed, the highest operating temperature of vessel (1) must obviously never exceed, and must be less than, the "critical temperature" of the solvent (mixture) in use.

Also this highest operating temperature would be limited to a temperature less than that above which damage to the raw-material or the extract might occur.

Lower Limit of Operating Temperature of Vessel (2)

The operating temperature of Vessel (2) must be as low as can be conveniently arranged. Sub-ambient and even refrigeration temperatures can be used.

The lower limit of operation of Vessel (2) will be determined by the characteristics of the solution (and its ability to dissolve solute). The solute must dissolve in the solvent as "poorly" as can be arranged and the "poverty" of this dissolution can be enhanced by lowering the temperature of operation of Vessel (2). The low limit is also governed by the viscosity of the resulting oil since at very low temperatures some oils may become difficult to handle.

The operation of the equipment is described for the purpose of illustration only as follows in relation to the extraction of an essential i.e. volatile oil: the substrate containing the essential oil is introduced into an extractor, having the shape of a flanged tube and furnished with removable end caps, each of which comprises a plate and a sheet of stainless steel mesh secured thereon to form a filter. The end caps or plates are also equipped with a port which is capable of closure and through which both gases and liquids can pass via the stainless steel filter mesh.

The extractor is closed and air is pumped out to a pressure of less than 40 mbar. A source of supply of liquid iodotrifluoromethane is connected to the extractor and liquid solvent is allowed to pass to the extractor. The contents of the extractor are thus bathed in iodotrifluoromethane. The extractor is then sealed as the source of iodotrifluoromethane is disconnected. The extractor is then tumbled on its lateral axis for a period of time to ensure intimate contact between the solvent and the substance.

After the tumbling has stopped, the outlet is connected via alternative pipework to a small evaporator which has previously been evacuated to a pressure of 40 mbar. The solution of oil in the iodotrifluoromethane solvent is allowed to pass intermittently from the extractor into the evaporator, to retain a level of liquid and gas filled headspace in the evaporator. The evaporator is then connected to the inlet of a compressor which is allowed to withdraw iodotrifluoromethane gas from the head space of the evaporator and to compress the gas (on its outlet side) to a pressure in excess of 5 bar.

A this pressure, and at room temperature, the gas is reliquefied and can either be recycled to the extractor to flush out residual oil or be reintroduced to the original reservoir of solvent for re-use on a further bath.

Inevitably, during this process the evaporator cools to very low temperatures and it is desirable to immerse it in a water bath furnished with an immersion heater and a thermostat. The thermostat can be set to activate the immersion heater when the water temperature falls to for example 10° C. and to switch off the heater whenever the temperature of the water exceeds for example 12° C. In this manner, the evaporator may be operated at about 10° C. and the vapour pressure is 1 to 3 bar at the compressor inlet.

The pressure contained the evaporator throughout this process is in the region of 206 kPa (30 psi). Once all the solution has passed from the extractor to the evaporator, and all the solvent from both the extractor and the evaporator has been evaporated, the vapour pressure inside the evaporator begins to fall.

When this pressure had fallen to just above 0 kPa (0 psig) an outlet on the bottom of the evaporator is opened so the oil solute (the extract) can run into a suitable receptacle.

Weighing of the receptacle before and after the introduction of the oil reveals the yield of fragrant oil.

Following removal of the oil, the compressor can be allowed to continue to suck residual solvent vapour from the extractor and from the substrate within it. By the time the pressure within the extractor has fallen to 100 mbar over 99.9% of the iodotrifluoromethane solvent will have been returned to the original reservoir.

To improve the recovery of the solvent the extractor and the extracted substrate can be heated.

The present invention will now be illustrated by means of the following examples.

EXAMPLE 1

At an ambient temperature of 20 degrees Celsius, 140 grams of peanut oil were introduced into a PET bottle of capacity 2500 ml and designed to withstand 10 BarG. The bottle was fitted with an aerosol valve. This oil was dissolved in 780 grams of iodotrifluoromethane which was introduced into the bottle, via the aerosol valve, from a bulk container.

The solution formed was crystal clear and pale yellow in colour. It formed a completely homogeneous solution, a single phase.

HFC 134a was then introduced into the bottle via the aerosol valve from a similar bulk storage container, until the mixture separated into two distinct layers. The bottle was weighed to ascertain how much HFC 134a had been added. This proved to be 440 grams of HFC 134a. The upper layer of the two phase system was yellow and clear. The lower layer was clear and water white.

Warming this two phase mixture to 42 degrees Celsius with gentle agitation for a few seconds, caused it to become clear. It formed a single phase homogeneous solution.

Upon cooling, a two phase system re-formed, with the yellow layer lying on top of a clear water white layer.

The composition of the solvent in this case was 36.1% HFC 134a:63.9% ITFM w/w.

EXAMPLE 2

At an ambient temperature of 20 degrees Celsius, 140 grams of peanut oil were introduced into a PET bottle similar to that of Example 1. On this occasion, 810 grams of iodotrifluoromethane were introduced into the bottle via the aerosol valve. A yellow, bright homogeneous solution was obtained.

On this occasion, 440 grams of HFC 134a were introduced into the bottle. The contents of the bottle remained as a single phase, slightly opalescent solution.

Cooling this solution to 4 degrees Celsius caused it to separate into a "two phase" system. The upper layer being yellow and the lower layer being clear and water white. Allowing this mixture to warm to room temperature (20 degrees Celsius) with gentle agitation, caused the two phase mixture to revert to its original state as a single phase, homogeneous (if slightly opalescent) solution.

The composition of the solvent in this case was 35.3% HFC 134a:64.8% ITFM w/w.

EXAMPLE 3

224 grams of finely ground sesame seeds were introduced into a 2500 ml capacity PET bottle fitted with an aerosol valve, at an ambient temperature of 20 degrees Celsius. 780 grams of iodotrifluoromethane was introduced to the bottle via the aerosol valve from a bulk container.

Shaking the bottle caused a distribution of the sesame seed paste. The bio-mass floated to the top as the specific gravity of the ITFM is close to 2.0 To this mixture was added 480 grams of HFC 134a. Placing this mixture in the fridge at 4 degrees Celsius caused agglomeration of the bio-mass. A single lump of solids was obtained which could not be easily broken up with shaking. This was assumed to be due to the precipitated oil and sesame seed biomass becoming remixed.

Allowing this mixture to warm to room temperature caused re-dissolution of the oil and the sesame seed biomass was then much easier to disperse in the liquid.

The liquid phase of this mixture was harvested by inverting the bottle, via a filter attached to the aerosol valve, into a second PET container. A clear homogeneous liquid was obtained.

Refrigeration of this liquid caused it to separate into two layers. Both layers could be harvested separately (by inverting the bottle) and the lower layer was found to contain mostly solvent whilst the upper layer comprised mostly oil (with a little solvent dissolved in it).

The composition of the solvent in this case was 38% HFC 134a:62% ITFM w/w.

EXAMPLE 4

20 grams of peanut butter (Sun Pat) were introduced into a 210 ml capacity PET bottle fitted with an aerosol valve and filter. 195 grams of ITFM were added. The mixture formed a cream coloured, even dispersion. 101 grams of HFC 134a were then added and the mixture shaken. The solution was filtered into a new PET bottle. 274 grams of solution were recovered.

To this solution was added a further 7 grams of HFC 134a. It remained as a single phase.

A further 5 grams of HFC 134a were added. The mixture was now refrigerated and two distinct layers formed. The lower layer of this solution was recovered and added to a further 141 grams of peanut butter at 20 degrees Celsius. A milky even dispersion of creamy coloured peanut biomass was formed. This mixture was again filtered back into the bottle in which the solution had originally been filtered and the combined filtrates were again refrigerated.

Refrigeration of this solution caused a great deal of oil to precipitate out of solution and a thick layer of yellow oil formed on the surface. This oily material was easily recovered by inverting the bottle following the removal of the lower (largely solvent) layer.

The composition of the solvent in this mixture was 37% HFC 134A:63% ITFM w/w.

EXAMPLE 5

28 grams of ground roasted cocoa beans were placed into a 210 ml capacity PET bottle and an aerosol valve with filter was attached. 189 grams of IIFM were added and 106 grams of HFC 134a.

The mixture was filtered into a second bottle and refrigerated to minus 10 degrees Celsius. White, solid, cocoa butter was seen to rise to the surface. Re-warming of this bottle to room temperature caused the cocoa butter to melt, redissolve and become homogeneously distributed throughout the liquid phase.

The composition of the solvent in this mixture was 36% HFC 134a:64% ITFM w/w.

The present invention thus addresses many of the disadvantages discussed above and provides a means of obtaining fixed oils and mineral oils in good yields in a form approaching 100% purity.

What is claimed is:

1. A method of extracting a component selected from oils, pigments, pharmacologically active ingredients and resins from a substance bearing the component, comprising:

(a) contacting the substrate with a solvent comprising iodotrifluoromethane and, optionally, one or more co-solvents to form a solution of the component in the solvent;

(b) separating the solution from the substrate; and (c) removing the solvent from the solution to provide the desired component.

2. A method as claimed in claim 1 further comprising contacting the solvent with the substrate in a first vessel and separating the resulting solution from the substrate by transferring the solution to a second vessel while retaining the extracted substrate in the first vessel.

3. A method as claimed in claim 2 wherein the first and second vessels are each sealable and each include an openable and closeable valve, the method further comprising the steps of:

(i) connecting the vessels together to provide a flow path between the vessels via said valves; and (ii) causing the solution to flow from the first vessel to the second vessel.

4. A method as claimed in claim 2 further comprising the step of applying heat to heat the solvent in the first vessel.

5. A method as claimed in claim 2 further comprising the step of cooling the solution in the second vessel.

6. A method as claimed in claim 1 including an additional step, after step (a), of adding one or more further solvents to the solution of the component in the solvent comprising iodotrifluoromethane so as to reduce the spectrum of solutes dissolved.

7. A method according to claim 6 wherein the further solvent is selected from 1,1,1,2-tetrafluoroethane and 1,1,1,2,2,3,4,5,5,5-decafluoropentane.

8. A method of extracting component selected from oils, pigments pharmacologically active ingredients and resins from a substrate bearing the component comprising:

(a) providing an apparatus comprising first and second sealable vessels, the first vessel including means for retaining said substrate in the vessel, each vessel having an inlet and an outlet and being so connected as to provide a fluid flow circuit only in the direction from the outlet of the first vessel to the inlet of the second vessel and from the outlet of the second vessel to the inlet of the first vessel;

(b) charging the substrate bearing the component into the first vessel;

(c) charging the apparatus with a solvent comprising iodotrifluoromethane and, optionally, one or more co-solvents so that the solvent contacts the substrate and forms a solution of the component in the solvent;

(d) causing said solution to flow in said fluid flow circuit from the first vessel to the second vessel; and (e) separating the solvent from the component in the second vessel and recovering the component.

9. A method as claimed in claims 1 or 8 wherein the optional co-solvent is selected from 1,1,1,2-tetrafluoroethane and 1,1,1,2,2,3,4,5,5,5-decafluoropentane.

10. A method as claimed in claim 8 further comprising the step of applying heat to the solvent in the first vessel, or adjacent the inlet of the first vessel.

11. A method as claimed in claim 8 further comprising the step of cooling the contents of the second vessel.

12. A method as claimed in claim 8 further comprising recovering the separated solvent for use in further extractions.

13. A method according to claim 8 including an additional step, after step (c), of adding one or more further solvents to the solution of the component in the solvent comprising iodotrifluoromethane so as to reduce the spectrum of solutes dissolved.

14. A method according to claim 13 wherein the further solvent is selected from 1,1,1,2-tetrafluoroethane and 1,1,1,2,2,3,4,5,5,5-decafluoropentane.

15. A method of extracting oil from an oil bearing substrate comprising the steps of:

(i) contacting the substrate with a solvent comprising iodotrifluoromethane and, optionally, one or more solvents thereby to dissolve the oil in the solvent; and (ii) causing the oil to separate from the solvent to form immiscible liquid layers of oil and solvent.

16. A method as claimed in claim 15 wherein step (ii) involves cooling the solution of oil in the solvent.

17. A method as claimed in claim 15 wherein step (i) includes heating the solvent.

18. A method according to claim 15 including an additional step, after step (i), of adding one or more further solvents to the solution of oil in the solvent comprising iodotrifluoromethane so as to reduce the spectrum of solutes dissolved.

19. A method according to claim 18 wherein the further solvent is selected from 1,1,1,2-tetrafluoroethane and 1,1,1,2,2,3,4,5,5,5-decafluoropentane.

20. A method of extracting a component selected from oils, pigments, pharmacological active ingredients and resins from a substrate bearing the component, comprising the steps of:

(i) contacting the substrate with a solvent comprising iodotrifluoromethane and, optionally, one or more co-solvents, thereby to dissolve the component in the solvent; and (ii) allowing the solvent to evaporate at ambient or sub-ambient temperatures.

21. A method as claimed in claim 20 further comprising recovering the evaporated solvent and compressing the solvent to re-liquify it.

22. A method according to claim 20 including an additional step, after step (i), of adding one or more further solvents to the solution of the component in the solvent comprising iodotrifluoromethane so as to reduce spectrum of solutes dissolved.

23. A method according to claim 22 wherein wherein the further solvent is selected from 1,1,1,2-tetrafluoroethane and 1,1,1,2,2,3,4,5,5,5-decafluoropentane.

24. A method of extracting a component selected from oils, pigments, pharmacologically active ingredients and resins from a substrate bearing the component comprising using iodotrifluoromethane as a solvent for extraction.

25. An apparatus for the extraction of component selected from oils, pigments, pharmacologically active ingredients and resins from a substrate bearing the component, comprising first and second vessels, connecting means providing fluid communication between the vessels, closable valves operable to prevent fluid communication between the vessels, the first vessel being adapted to receive the substrate bearing the component and including means for retaining the substrate in the first vessel, and, a solvent provided in the first vessel comprising iodotrifluoromethane and, optionally, at least one co-solvent, which solvent may be transferred between the first and second vessels via the closeable valves;

wherein each vessel comprises an inlet and an outlet, the outlet of the first vessel is connected by first connecting means to the inlet of the second vessel, the outlet of the second vessel is connected by second connecting means to the inlet of the first vessel, the first and second connecting means include closable valves, and each closable valve is a one-way valve permitting fluid flow in one direction only, the valves being arranged to a provide a fluid circuit such that the solvent may flow around the circuit in one direction only; and wherein one closable one-way valve is provided at each respective inlet and each respective first and second vessels.

* * * * *